United States Patent
Lin et al.

(10) Patent No.: US 10,204,504 B1
(45) Date of Patent: Feb. 12, 2019

(54) ELECTRONIC DEVICE AND DROP WARNING METHOD

(71) Applicant: HTC Corporation, Taoyuan (TW)

(72) Inventors: Chao-Hung Lin, Taoyuan (TW); Chin-Yu Wang, Taoyuan (TW); Ming-Chang Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/835,433

(22) Filed: Dec. 7, 2017

(51) Int. Cl.
  *G08B 21/18* (2006.01)
  *G01B 7/16* (2006.01)
  *G01P 15/18* (2013.01)

(52) U.S. Cl.
  CPC ............. *G08B 21/182* (2013.01); *G01B 7/18* (2013.01); *G01P 15/18* (2013.01)

(58) Field of Classification Search
  CPC . G01P 15/18; G01B 7/18; G06F 1/182; G06F 1/1626; G06F 1/1637; G06F 1/1656; G06F 1/1694; G06F 2200/1633; G08B 21/182; H02K 7/063; H02K 11/00; H04M 1/185; H04M 2250/12; H04M 1/0266
  See application file for complete search history.

(56) References Cited

U.S. PATENT DOCUMENTS

| | | | | |
|---|---|---|---|---|
| 2010/0188243 A1* | 7/2010 | Tysowski | ............... | G08B 21/24 340/669 |
| 2012/0136618 A1* | 5/2012 | Lahaie | ............... | G01P 15/0891 702/141 |
| 2013/0082973 A1* | 4/2013 | Wurzel | ................... | G06F 3/044 345/174 |
| 2014/0013141 A1* | 1/2014 | Heo | ...................... | G06F 1/3293 713/323 |

\* cited by examiner

*Primary Examiner* — Brian Wilson
(74) *Attorney, Agent, or Firm* — JCIPRNET (57) ABSTRACT

An electronic device including a signal processing circuit, an acceleration sensor, and an edge sensor is provided. The electronic device has a device body. The signal processing circuit operates in a sleep mode. The acceleration sensor senses an acceleration variation of the device body to generate an acceleration sensing signal. The acceleration sensor determines whether the acceleration sensing signal is continuously lower than an acceleration threshold for a preset length of time to wake up the signal processing circuit. When the acceleration sensor wakes up the signal processing circuit, the signal processor enables the edge sensor. The edge sensor senses a deformation variation of the device body to generate at least one deformation sensing signal. The signal processing circuit analyzes the deformation sensing signal to determine whether a drop event of the device body occurs. In addition, a drop warning method is also provided.

16 Claims, 7 Drawing Sheets

ELECTRONIC DEVICE AND DROP WARNING METHOD

BACKGROUND OF THE INVENTION

1. Field of the Invention

The invention relates to a warning technology, and particularly relates to an electronic device capable of drop warning and a drop warning method.

2. Description of Related Art

When a mobile device drops from the user's clothes or personal belongings or a vehicle, the user is usually not aware of losing the mobile device until the next time the user intends to use the mobile device. In known applications, the user may send commands such as locking the device, starting a warning sound, removing stored data, and/or the like via a communication device and check a current location of the mobile device by resorting to a built-in positioning technology, such as the GPS technology, to find the device. However, there is a window period between the time when the mobile device is lost and the time when the user notices the loss and takes actions remotely or finds the mobile device back. Moreover, the longer the window period is, the more likely that the data in the mobile device is leaked and the less likely that the user is able to find the mobile device back. Besides, the user also faces the risk of not being able to take any action, as the communication network may be disconnected or the mobile device may be out of power. In view of the above, several embodiments of the invention are described in the following.

SUMMARY OF THE INVENTION

One or some exemplary embodiments of the invention provides an electronic device capable of automatically generating a drop warning signal.

An electronic device according to an embodiment of the invention has a device body. The electronic device includes a signal processing circuit, an acceleration sensor, and at least one edge sensor. The signal processing circuit operates in a sleep mode. The acceleration sensor is coupled to the signal processing circuit. The acceleration sensor senses an acceleration variation of the device body to generate an acceleration sensing signal. The acceleration sensor determines whether the acceleration sensing signal is continuously lower than an acceleration threshold for a preset length of time to wake up the signal processing circuit.

A drop warning method according to an embodiment of the invention is suitable for an electronic device including a device body. The method includes the following steps: a signal processing circuit, operating in a sleep mode; sensing an acceleration variation of the device body by an acceleration sensor to generate an acceleration sensing signal, and determining whether the acceleration sensing signal is continuously lower than an acceleration threshold for a preset length of time by the acceleration sensor to wake up the signal processing circuit; enabling the at least one edge sensor by the signal processing circuit when the acceleration sensor wakes up the signal processing circuit, and sensing a deformation variation of the device body by the at least one edge sensor to generate at least one deformation sensing signal; and analyzing the at least one deformation sensing signal by the signal processing circuit to determine whether a drop event of the device body occurs.

Based on the above, the electronic device and the drop warning method according to one or some exemplary embodiment of the invention may effectively determine whether the drop event of the device body of the electronic device occurs by adopting the acceleration sensor, the edge sensor, and the signal processing circuit, so as to generate the warning signal to notify the user in a real-time manner.

In order to make the aforementioned and other features and advantages of the invention comprehensible, several exemplary embodiments accompanied with figures are described in detail below.

DESCRIPTION OF THE EMBODIMENTS

In order to make the invention more comprehensible, embodiments are described below as the examples to show the invention. Moreover, elements/components/steps with same reference numerals represent same or similar parts in the drawings and embodiments.

Figure 1:
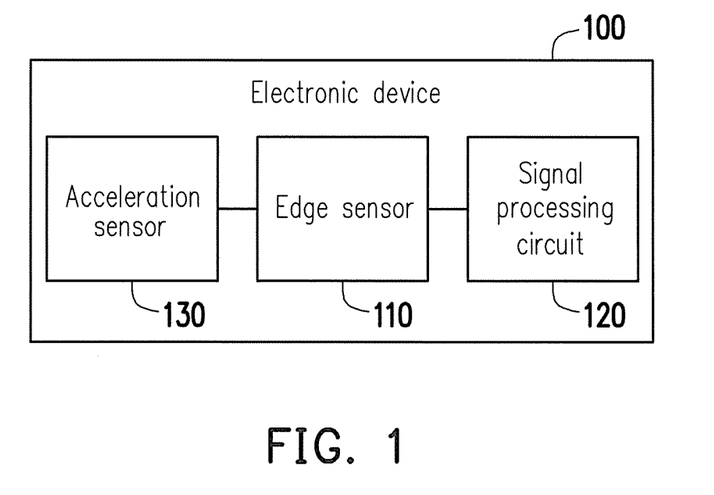
FIG. 1 is a block diagram illustrating an electronic device according to an embodiment of the invention.

FIG. 1 is a block diagram illustrating an electronic device according to an embodiment of the invention. Referring to FIG. 1, an electronic device 100 includes a signal processing circuit 110, an acceleration sensor 120, and an edge sensor 130. The signal processing circuit 110 is coupled to the acceleration sensor 120 and the edge sensor 130. In the embodiment, the signal processing circuit 110 initially operates in a sleep mode, and the acceleration sensor 120 senses an acceleration variation of a device body of the electronic device 100 to generate an acceleration sensing signal. In the embodiment, the acceleration sensor 120 determines whether to wake up the signal processing circuit 110 by determining whether the acceleration sensing signal is continuously lower than an acceleration threshold for a preset length of time.

Specifically, when the acceleration sensor 120 determines that the acceleration sensing signal is continuously lower than the acceleration threshold for the preset length of time, the acceleration sensor 120 may immediately wake up the signal processing circuit 110 for the signal processing circuit 110 to enable the edge sensor 130. In the embodiment, the edge sensor 130 senses a deformation variation of the device body of the electronic device 100 to generate a deformation sensing signal. The edge sensor 130 outputs the deformation sensing signal to the signal processing circuit 110. Accordingly, the signal processing circuit 110 may determine whether a drop event of the device body of the electronic device 100 occurs by analyzing the deformation sensing signal and further generate a warning signal. In other words, when the acceleration sensor 120 does not determine that the acceleration sensing signal is continuously lower than the acceleration threshold for the preset length of time, the acceleration sensor 120 does not wake up the signal processing circuit 110. In addition, if the signal processing circuit 110 determines that the drop event of the device body of the electronic device 100 does not occur, the signal processing circuit 110 may resume to operate in the sleep mode. In other words, the electronic device 100 of the embodiment is able to determine whether the drop event occurs while reduce power consumption.

In the embodiment, the electronic device 100 may be portable electronic device, such as a phone, a panel PC, a wearable device, a portable device, a notebook computer, or the like. In the embodiment, the signal processing circuit 110 is a central processing unit (CPU), a system-on-chip (SOC), or other programmable general-purpose or specific-purpose microprocessors, digital signal processors (DSPs), programmable controllers, application specific integrated circuits (ASICs), programmable logic devices (PLDs), other similar processing devices, or a combination thereof. The signal processing circuit 110 is capable of signal analyzing, processing, and computing carry out the methods described in the respective embodiments of the invention.

In the embodiment, the acceleration sensor 120 is a G-sensor, for example. The acceleration sensor 120 may sense an acceleration value of a single axis or acceleration values of multiple axes, and is able to determine a size of the acceleration value. For example, the acceleration sensor 120 may be disposed inside the device body and correspondingly generate the acceleration sensing signal based on a movement of the device body. The acceleration sensing signal may include an X-axis acceleration value, a Y-axis acceleration value, and a Z-axis acceleration value. In addition, when the acceleration sensor 120 determines that the X-axis acceleration value, the Y-axis acceleration value, and the Z-axis acceleration value are all continuously lower than the acceleration threshold for the present length of time, the acceleration sensor 120 may wake up the signal processing circuit 110.

In the embodiment, when the device body of the electronic device 100 is in the drop event, since the device body exhibits an inertial acceleration when dropping, the X-axis acceleration value, the Y-axis acceleration value, and the Z-axis acceleration value sensed by the acceleration sensor 120 should all be 0 in an ideal state. Nevertheless, in the embodiment, considering that the acceleration values measured by the acceleration sensor 120 may show slight errors, the acceleration sensor 120 of the embodiment is designed to determine that the electronic device 100 may be in the drop event when the X-axis acceleration value, the Y-axis acceleration value, and the Z-axis acceleration value are continuously lower than the acceleration threshold for the preset length of time. Thus, in an embodiment, the acceleration sensor 120 may further include a comparator and a controller. The comparator compares the acceleration threshold and the acceleration sensing signal to output a comparison result to the controller. In addition, when the controller determines that the acceleration sensing signal is continuously lower than the acceleration threshold for the preset length of time, the controller may output a wakeup signal to the signal processing circuit to wake up the signal processing circuit.

In the embodiment, the edge sensor 130 may be a balanced bridge structure including a plurality of pressure sensitive varistors, for example. The balanced bridge structure may be a Wheatstone bridge, for example. The edge sensor 130 may adopt a digital value generated in correspondence with a variation of a voltage value as the deformation sensing signal. In the embodiment, the edge sensor 130 may be disposed at a specific frame position of the device body of the electronic device 100 to sense whether the specific frame position of the device body of the electronic device 100 is subjected to a pressure and deformed.

For example, in an embodiment, the electronic device 100 is a phone device. When the user puts the electronic device 100 at a location such as in a backpack or a pocket, since the electronic device 100 is not in a state of being operated, the electronic device 100 may be operated in a sleep state (excluding the acceleration sensor 120). However, if the electronic device 100 drops, the electronic device 100 may automatically determine whether the drop event occurs to wake up the electronic device 100. Hence, the electronic device 100 may send a warning to the user or execute a relevant protection procedure in a real-time manner. Nevertheless, the invention does not intend to impose a limitation on this regard.

Figure 2:
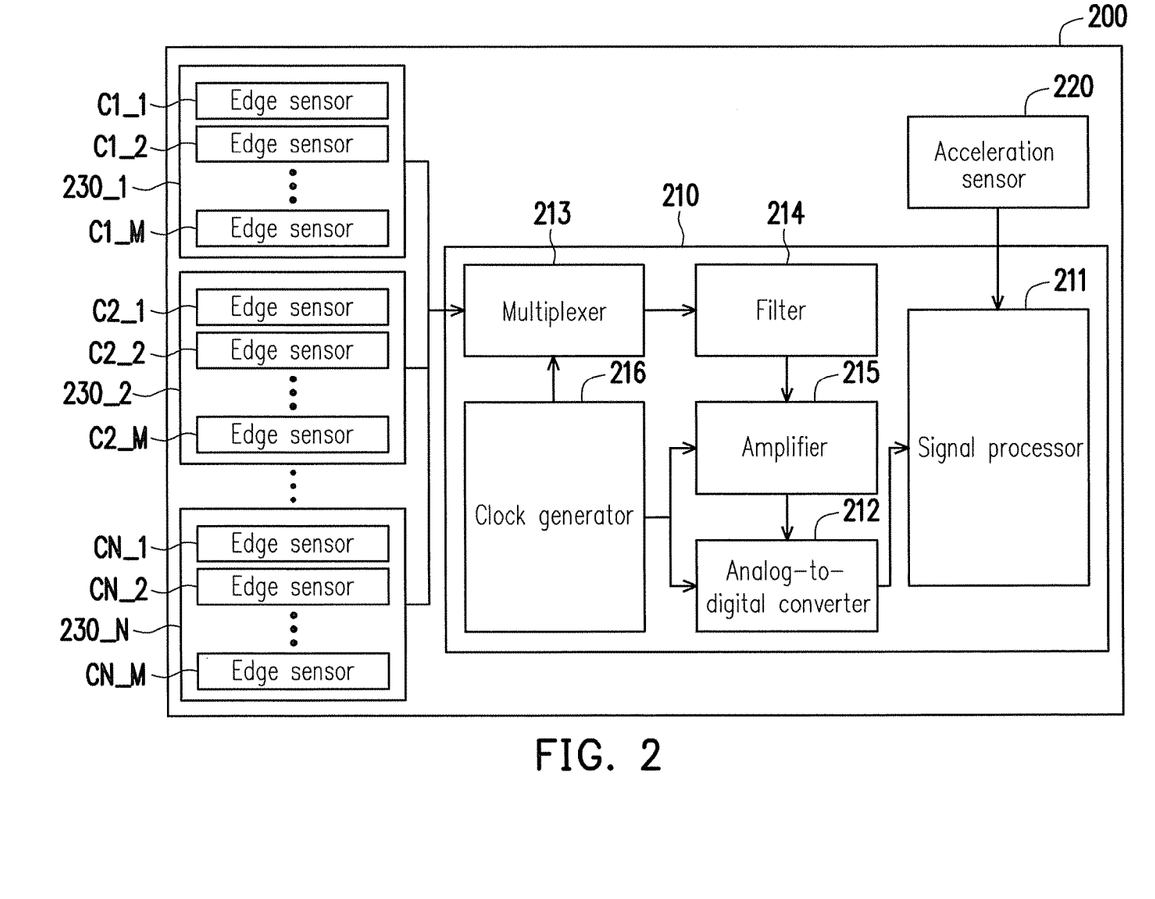
FIG. 2 is a block diagram illustrating an electronic device according to another embodiment of the invention.

FIG. 2 is a block diagram illustrating an electronic device according to another embodiment of the invention. Referring to FIG. 2, an electronic device 200 includes a signal processing circuit 210, an acceleration sensor 220, and a plurality of edge sensing modules 230_1 and 230_2 to 230_N, wherein N is a positive integer greater than 0. In the embodiment, the edge sensing modules 230_1 and 230_2 to 230_N may be respectively disposed at a plurality of frame positions of the device body of the electronic device 200, for example. Accordingly, a plurality of sensing regions may be formed at the frame positions of the device body. Besides, the edge sensing modules 230_1 and 230_2 to 230_N may respectively include edge sensors C1_1 and C1_2 to C1_M, C2_1 and C2_2 to C2_M, until CN_1 and CN_2 to CN_M, wherein M is a positive integer greater than 0. In other words, in the embodiment, the sensing regions may be disposed on the device body of the electronic device 200 to facilitate the accuracy and the sensitivity of determining whether the drop event of the device body occurs. For example, the sensing regions may be disposed at the upper side, the lower side, the left side, the right side, the upper left corner, the upper right corner, the lower left corner, the lower right corner, the front side, or the rear side. The invention does not intend to impose a limitation on this regard. When the electronic device 200 is operated in a normal mode, the edge sensing modules 230_1 and 230_2 to 230_N may be applied in relevant operating functions or software applications of the electronic device 200.

In the embodiment, the signal processing circuit 210 includes a signal processor 211, an analog-to-digital converter (ADC) 212, a multiplexer 213, a filter 214, an amplifier 215, and a clock generator 216. In the embodiment, the multiplexer 213 is coupled to the edge sensors C1_1 and C1_2 to C1_M, C2_1 and C2_2 to C2_M, until CN_1 and CN_2 to CN_M. The multiplexer 213 receives deformation sensing signals respectively provided by the edge sensors C1_1 and C1_2 to C1_M, C2_1 and C2_2 to C2_M, until CN_1 and CN_2 to CN_M in a time-interleaved manner, and outputs the deformation sensing signals having the same sampling length to the filter 214 and the amplifier 215. In the embodiment, the filter 214 filters the deformation sensing signals to filter out noise. The amplifier 215 amplifies the filtered deformation sensing signals to facilitate a signal strength. In the embodiment, the analog-to-digital converter 212 converts the deformation sensing signal in an analog form into a digital form, and outputs the converted deformation sensing signal to the signal processor 211. In the embodiment, the clock generator 216 may provide a plurality of clock signals to the analog-to-digital converter 212, the multiplexer 213, and the amplifier 215 to synchronize an operational temporal order of the circuit elements.

In the embodiment, the signal processor 211 may be a processing circuit, such as a digital signal processor (DSP), a system-on-chip (SOC), an application specific integrated circuit (ASIC), or the like. The signal processor 211 may analyze the converted deformation sensing signal to determine whether the drop event of the device body occurs. Besides, when the signal processor 211 determines that the drop event of the device body occurs, the signal processor 211 may further output a warning signal to other functional circuit elements or applications of the electronic device 200 to execute a predetermined warning function.

The numbers of edge sensing modules and edge sensors of the invention are not limited to the illustration of FIG. 2. In an embodiment, the electronic device 200 may only include a single edge sensor and determine whether a specific side of the device body of the electronic device 200 is deformed by using the single edge sensor. In addition, the multiplexer 213 may be omitted in the signal processing circuit 210. The signal processing circuit 210 may directly receive the deformation sensing signal provided by the single edge sensor. Besides, in another embodiment, the filter 214 and the amplifier 215 may also be omitted in the electronic device 200, and the deformation sensing signal is directly received by the analog-to-digital converter 212. In other words, based on different device needs, product designs, or circuit configurations, the multiplexer 213, the filter 214, the amplifier 215, and the clock generator 216 may be optionally disposed in the electronic device 200 of the embodiment.

Figure 3:
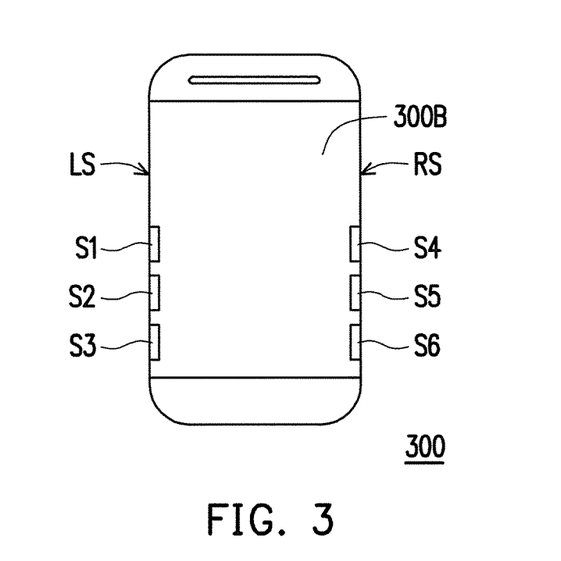
FIG. 3 is a schematic view illustrating an electronic device according to an embodiment of the invention.

FIG. 3 is a schematic view illustrating an electronic device according to an embodiment of the invention. Referring to FIG. 3, in the embodiment, the electronic device 300 is a phone device. A plurality of edge sensors S1, S2, and S3 is disposed at a frame on a left side LS of a device body 300B of the electronic device, and a plurality of edge sensors S4, S5, and S6 is disposed at the frame on a right side RS of the device body 300B. In the embodiment, the signal processing circuit and the acceleration sensor as described in the embodiments of FIG. 1 or 2 are disposed in the device body 300B of the electronic device 300. In the embodiment, when the electronic device 300 performs a normal operation, the edge sensors S1 to S6 allow the user to operate by pressing or touching in response to relevant functions of applications of the electronic device 300.

Figure 4:
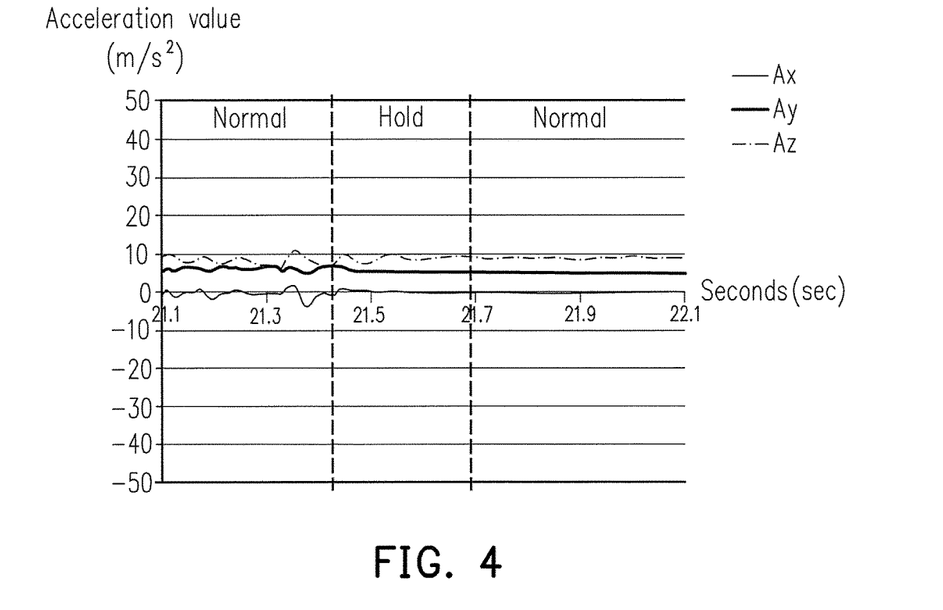
FIG. 4 is a schematic view illustrating an acceleration sensing signal according to an embodiment of the invention.

FIG. 4 is a schematic view illustrating an acceleration sensing signal according to an embodiment of the invention. Referring to FIGS. 3 and 4, in the embodiment, when the electronic device 300 is operated in the normal mode, the acceleration sensor of the electronic device 300 may sense an acceleration variation of the device body 300B of the electronic device 300. For example, the acceleration sensor of the electronic device 300 may sense the acceleration sensing signal shown in FIG. 4. In the embodiment, the acceleration sensing signal may include an X-axis acceleration value Ax, a Y-axis acceleration value Ay, and a Z-axis acceleration value Az. Besides, when the user normally and motionlessly uses the electronic device 300, since the device body 300B is not moved drastically, the X-axis acceleration value Ax, the Y-axis acceleration value Ay, and the Z-axis acceleration value Az may be lower.

Figure 5:
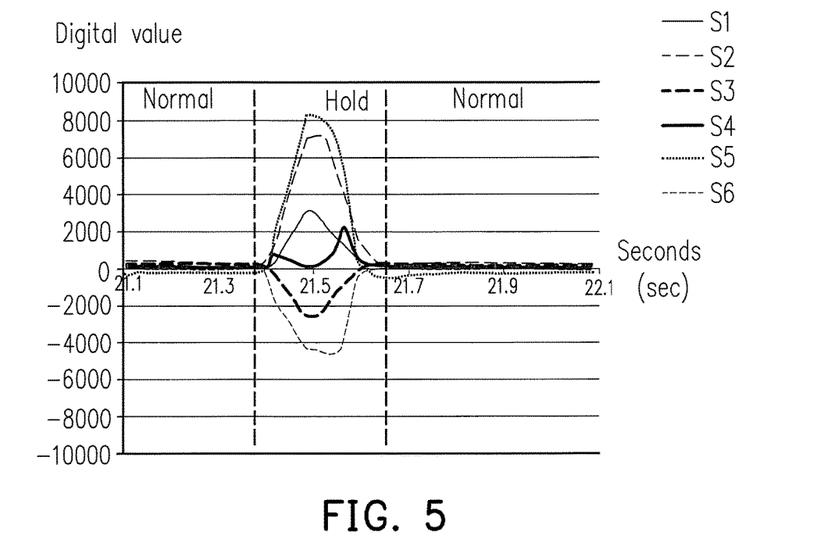
FIG. 5 is a schematic view illustrating deformation sensing signals according to an embodiment of the invention.
Figure 6:
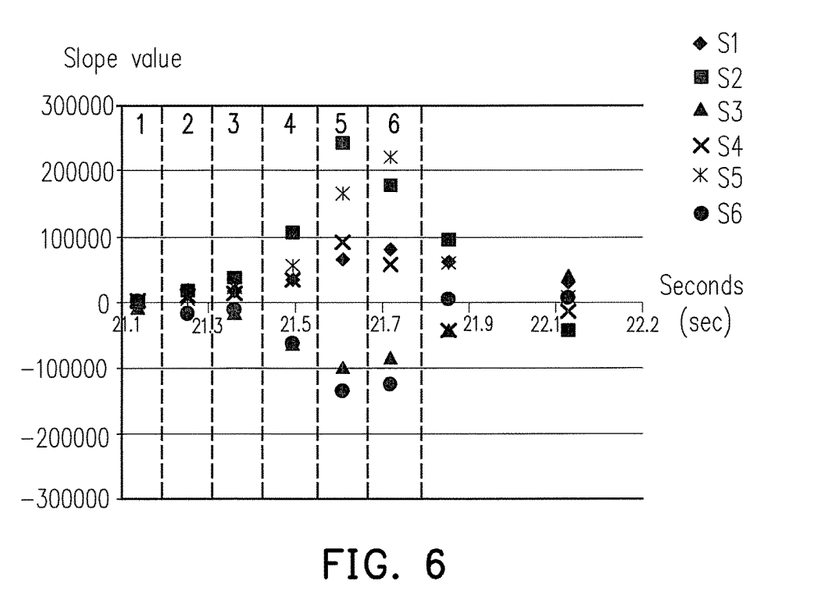
FIG. 6 is a schematic view illustrating slope variation distributions according to an embodiment of the invention.

FIG. 5 is a schematic view illustrating deformation sensing signals according to an embodiment of the invention. FIG. 6 is a schematic view illustrating slope variation distributions according to an embodiment of the invention. Referring to FIGS. 3, 5, and 6, in the embodiment, when the electronic device 300 is operated in a normal mode, the edge sensors S1 to S6 may be provided to allow the user to operate by pressing or touching to execute the relevant functions of applications of the electronic device 300. Therefore, the edge sensors S1 to S6 of the electronic device 300 may sense the deformation sensing signals shown in FIG. 5. In the embodiment, when the user does not press the edge sensors S1 to S6 (normal mode) or when the electronic device 300 is placed motionlessly, there is no significant digital value variation of the deformation sensing signals of the edge sensors S1 to S6. In the embodiment, when the user presses the edge sensors S1 to S6 (hold state), the deformation sensing signals of the edge sensors S1 to S6 may show significant digital value variations based on different degrees of pressing by the user.

Besides, in the embodiment, the signal processing circuit may analyze the deformation sensing signals provided by the edge sensors to obtain the slope variation distributions of the deformation sensing signals shown in FIG. 6. Slope values shown in FIG. 6 may be calculated by dividing the digital values by time values (i.e., digital value/time value). In the embodiment, the slope values corresponding to the deformation sensing signals of the edge sensors S1 to S6 are varied sequentially based on the degree of pressing.

Figure 7:
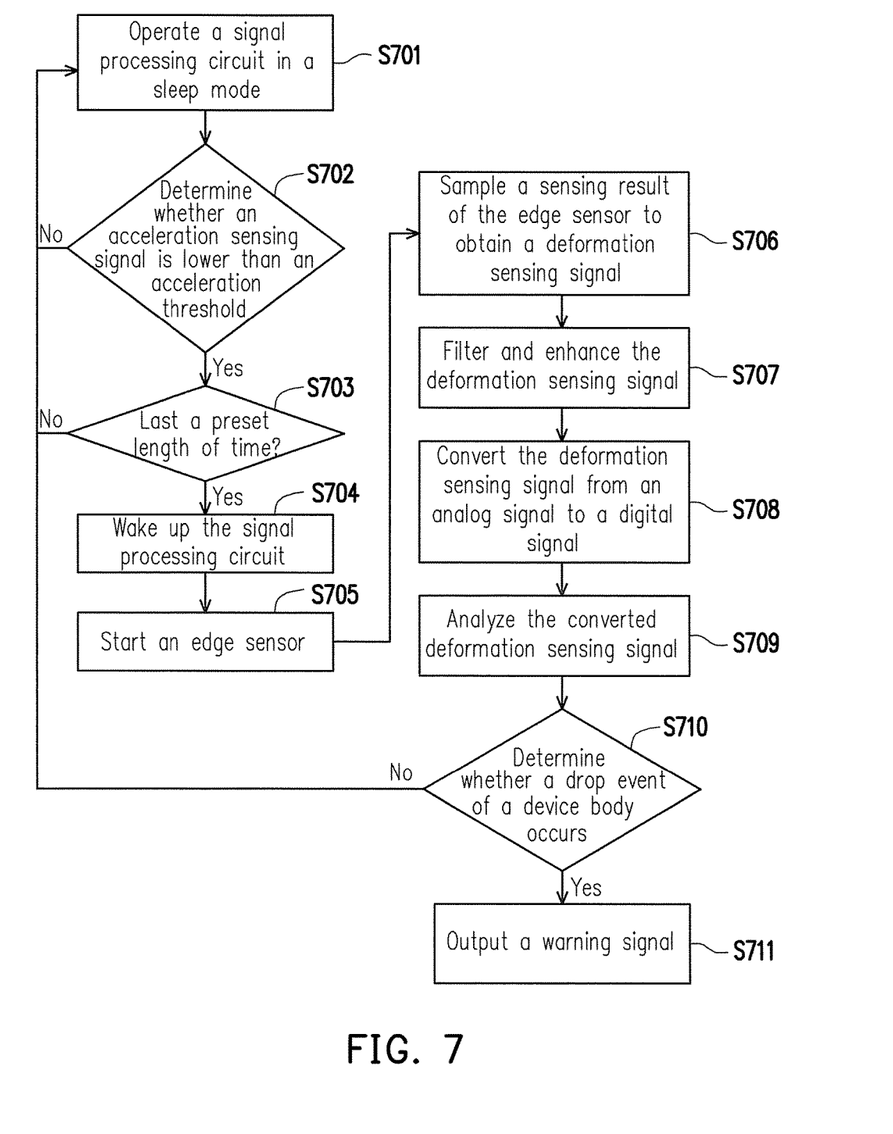
FIG. 7 is a flowchart illustrating a drop warning method according to an embodiment of the invention.

FIG. 7 is a flowchart illustrating a drop warning method according to an embodiment of the invention. The drop warning method of the embodiment is suitable for the electronic device of the embodiments of FIGS. 1 to 3. Referring to FIGS. 3 and 7, in the embodiment, the electronic device 300 is a phone device. In the electronic device 300, the edge sensors S1 to S3 are disposed at the frame on the left side LS of the device body 300B, and the edge sensors S4 to S6 are disposed at the frame on the right side RS of the device body 300B. In the embodiment, the signal processing circuit and the acceleration sensor described in the embodiment of FIG. 1 or 2 are disposed in the device body 300B of the electronic device 300 for the electronic device 300 to carry out steps as follows.

At Step S701, the electronic device 300 operates the signal processing circuit (signal processor) in the sleep mode. In the embodiment, the signal processing circuit and the edge sensors S1 to S6 of the electronic device 300 initially operate in the sleep mode. However, the acceleration sensor of the electronic device 300 is continuously turned on. Accordingly, with the acceleration sensor, the electronic device 300 may determine whether the acceleration sensing signal is lower than the acceleration threshold in a real-time manner. If it is determined that the acceleration sensing signal is lower than the acceleration threshold, Step S703 is performed. At Step S703, the acceleration sensor of the electronic device further determines whether the acceleration sensing signal is continuously lower than the acceleration threshold for the preset length of time. If it is determined that the acceleration sensing signal is not continuously lower than the acceleration threshold for the preset length of time, Step S701 is performed. In the embodiment, the acceleration threshold may be, for example, 0.1 (m/s²), 1 (m/s²), 2 (m/s²), or the like and the preset length of time may be, for example, 0.1 milliseconds, 1 millisecond, 10 milliseconds, or the like. The acceleration threshold and the preset length of time may be determined based on different device needs or different product designs. The invention does not intend to impose a limitation on this regard.

At Step S703, when the acceleration sensor of the electronic device 300 determines that the acceleration sensing signal is continuously lower than the acceleration threshold for the preset length of time, the electronic device 300 performs Step S704. At Step S704, the acceleration sensor of the electronic device 300 wakes up the signal processing circuit. At Step S705, the signal processing circuit enables the edge sensors S1 to S6 to sense degrees of deformation of a plurality of sensing regions of the device body 300B. At Step S706, the signal processing circuit of the electronic device 300 may sample the edge sensors S1 to S6 through the multiplexer in a time-interleaved manner to obtain the deformation sensing signals. At Step S707, the signal processing circuit of the electronic device 300 may filter and enhance the deformation sensing signals through the filter and the amplifier. At Step S708, the signal processing circuit of the electronic device 300 may convert the deformation sensing signals through the analog-to-digital converter to convert the deformation sensing signals from analog signals to digital signals. At Step S709, the signal processing circuit of the electronic device 300 may analyze the deformation sensing signals through the signal processor. At Step S710, the signal processor of the electronic device 300 may determine whether the drop event of the device body 300B of the electronic device 300 occurs based on an analysis result on the deformation sensing signals. In addition, at Step S711, the signal processing circuit of the electronic device 300 may output a warning signal.

Besides, sufficient teaching, suggestions, and implementation details about relevant device properties, technical details, and embodying details of the electronic device 300 of the embodiment are already provided in the embodiments of FIGS. 1 to 6. Thus, details in this regard will not be repeated in the following. However, to allow people of ordinary skill in the art to further understand the specific details of signal analysis and determination in Steps S709 to S710, examples are provided in FIGS. 8 to 10 for description in greater detail.

Figure 8:
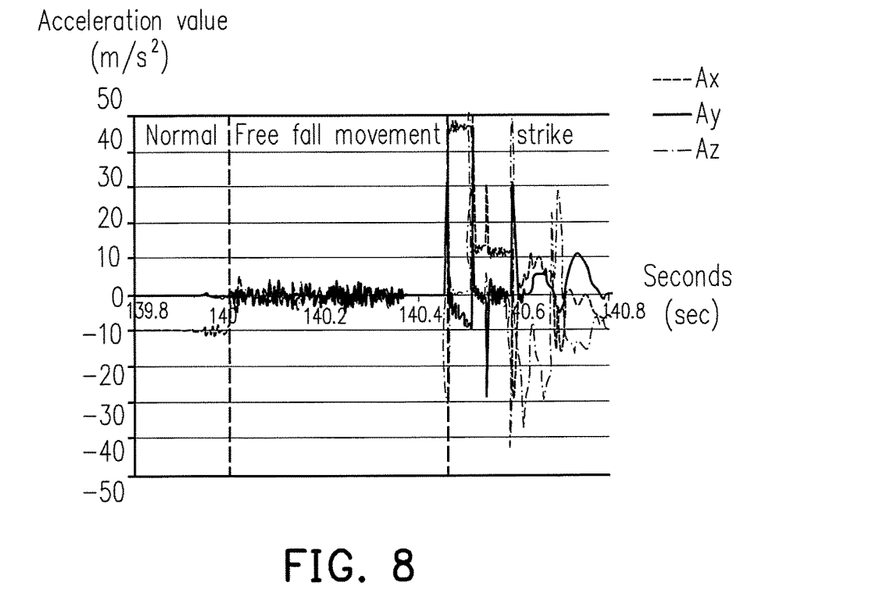
FIG. 8 is a schematic view illustrating an acceleration sensing signal according to another embodiment of the invention.

FIG. 8 is a schematic view illustrating an acceleration sensing signal according to another embodiment of the invention. Referring to FIGS. 3, 7, and 8, in the embodiment, the acceleration sensor of the electronic device 300 may sense the acceleration sensing signal as shown in FIG. 8. In the embodiment, the acceleration sensing signal may include the X-axis acceleration value Ax, the Y-axis acceleration value Ay, and the Z-axis acceleration value Az. For example, when the user carries the electronic device 300 to move in the X-axis direction (normal state), the X-axis acceleration value Ax may be a specific value, while the Y-axis acceleration value Ay and the Z-axis acceleration value Az may be approximately 0. However, when the drop event of the electronic device 300 occurs (free fall movement state), due to the inertial acceleration of the device body 300B of the electronic device 300 during dropping, the X-axis acceleration value Ax, the Y-axis acceleration value Ay, and the Z-axis acceleration value Az may be approximately 0. Therefore, the acceleration sensor of the electronic device 300 may promptly determine whether the X-axis acceleration value Ax, the Y-axis acceleration value Ay, and the Z-axis acceleration value Az are all continuously lower than the acceleration threshold for the preset length of time. If the X-axis acceleration value Ax, the Y-axis acceleration value Ay, and the Z-axis acceleration value Az are all continuously lower than the acceleration threshold for the preset length of time, the acceleration sensor wakes up the signal processing circuit. Besides, when the device body 300B of the electronic device 300 drops to a ground surface (strike state), the acceleration sensor may sense a drastic variation of the acceleration values. Therefore, at a moment when the device body 300B of the electronic device 300 drops to the ground surface, there is a more significant variation of the X-axis acceleration value Ax, the Y-axis acceleration value Ay, and the Z-axis acceleration value Az. In other words, in an embodiment, the electronic device 300 may further determine whether the drop event occurs based on a result of the variation of the X-axis acceleration value Ax, the Y-axis acceleration value Ay, and the Z-axis acceleration value Az.

Figure 9:
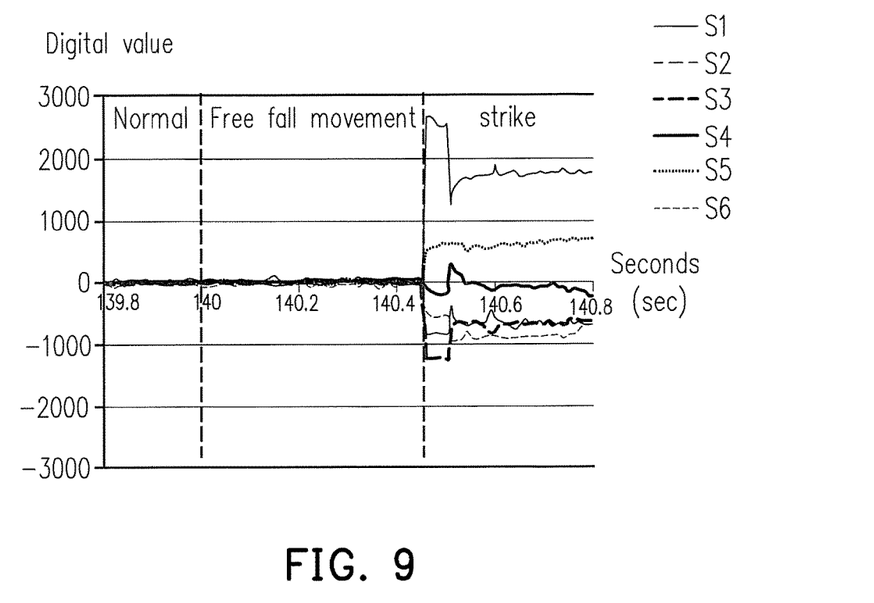
FIG. 9 is a schematic view illustrating a deformation sensing signal according to another embodiment of the invention.
Figure 10:
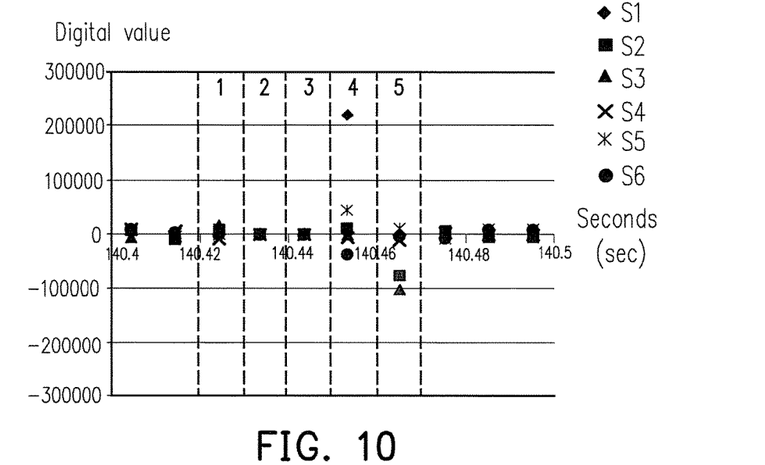
FIG. 10 is a schematic view illustrating slope variation distributions according to another embodiment of the invention.

FIG. 9 is a schematic view illustrating a deformation sensing signal according to another embodiment of the invention. FIG. 10 is a schematic view illustrating slope variation distributions according to another embodiment of the invention. Referring to FIGS. 3, 7, 9, and 10, in the embodiment, when the signal processing circuit of the electronic device 300 is waken up, the edge sensors S1 to S6 may sense deformation variations at the frame positions of the device body 300B corresponding to the sensing regions. For example, when the user carries the electronic device 300 in a movement state or a motionless state (normal state), the deformation sensing signals sensed by the edge sensors S1 to S6 show no significant variation. Besides, when the drop event of the electronic device 300 occurs (free fall movement state), since the device body 300B of the electronic device 300 is not deformed by a pressure during dropping, the deformation sensing signals sensed by the edge sensors S1 to S6 still show no significant variation. However, when the device body 300B of the electronic device 300 drops to the ground surface, the edge sensors S1 to S6 may respectively sense different and drastic deformation variations. Particularly, at the moment when the device body 300 drops to the ground surface, the edge sensors S1 to S6 may sense sudden digital value variations.

In the embodiment, the signal processing circuit may analyze the deformation sensing signals provided by the edge sensors S1 to S6 to obtain the slope variation distributions of the deformation sensing signals as shown in FIG. 10. For example, the frame position corresponding to the edge sensor S1 may be a first contact position between the device body 300B and the ground surface, so the deformation sensing signal sensed by the edge sensor S1 shows a drastic digital value variation at the moment when the device body 300B drops to the ground surface. In other words, the signal processor of the electronic device 300 may determine whether the at least one of the slope distributions corresponding to the edge sensors S1 to S6 includes a slope value whose slope variation within a unit time is greater than a slope threshold, so as to determine that the drop event of the device body 300B occurs. As another example, as shown in FIG. 10, the signal processor may determine whether at least one of the slope variations corresponding to the edge sensors S1 to S6 from a time point 3 to a time point 4 is greater than the slope threshold. The slope threshold may be 10000 or 20000, for example. Therefore, the signal processor of the electronic device 300 is able to accurately determine that the device body 300B drops to the ground surface and further output the warning signal.

Besides, in the embodiment, the electronic device 300 may further adjust the slope threshold. For example, since the edge sensors S1 to S6 may be triggered by mistake when the user lightly tosses or plays with the electronic device 300 or exerts a force when placing the electronic device 300, and the electronic device 300 may misjudge that the drop event occurs and generate the warning signal. Therefore, in an embodiment, the signal processor of the electronic device 300 may analyze slopes of increasing or decreasing of the deformation sensing signals. With such analysis together with determination on signal amplitudes, calculation of duration of free fall movement, and a learning mechanism of user behaviors, the accuracy of the analysis on the deformation sensing signals may be facilitated. In another example, the electronic device 300 may provide confirmation information to the user every time when the signal processor of the electronic device 300 generates the warning signal, so as to verify whether the drop event actually occurs through the user's feedback. Therefore, the signal processor of the electronic device 300 may record a plurality of events to determine whether the slope threshold is excessively high or low through an integrative analysis. Accordingly, the slope threshold may be adjusted by automatic learning, and the accuracy of determining the drop event through the signal processor of the electronic device 300 may be facilitated.

Figure 11:
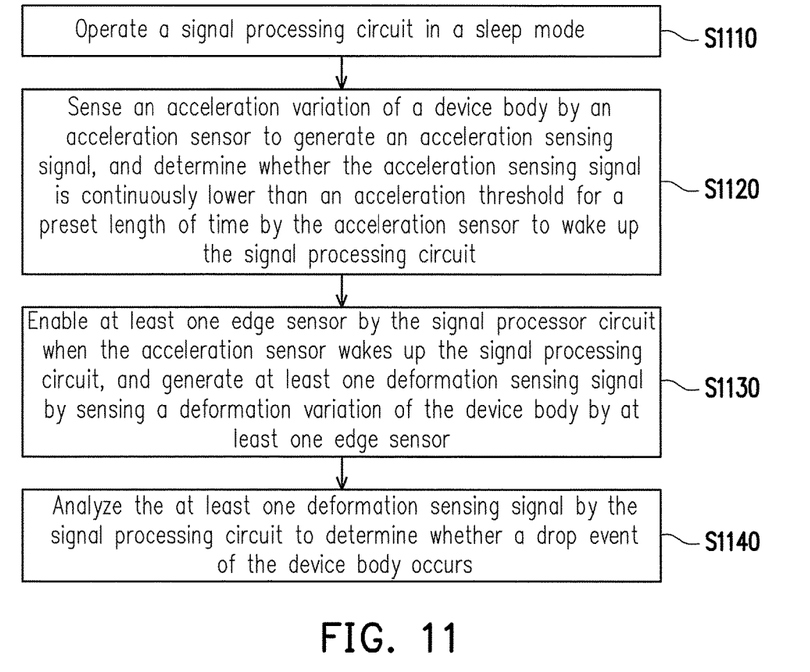
FIG. 11 is a flowchart illustrating a drop warning method according to another embodiment of the invention.

FIG. 11 is a flowchart illustrating a drop warning method according to another embodiment of the invention. Referring to FIGS. 1 and 11, the drop warning method according to the embodiment of the invention is at least suitable for the electronic device 100 in the embodiment of FIG. 1. At Step S1110, the electronic device 100 operates the signal processing circuit 110 in the sleep mode. At Step S1120, the electronic device 100 senses the acceleration variation of the device body through the acceleration sensor 120 to generate the acceleration sensing signal. In addition, the electronic device 100 determines whether the acceleration sensing signal is continuously lower than the acceleration threshold for the preset length of time through the acceleration sensor 120, so as to wake up the signal processing circuit 110. At Step S1130, when the acceleration sensor 120 wakes up the signal processing circuit 110, the electronic device 100 enables the edge sensor 130 through the signal processing circuit 110, and sense the deformation variation of the device body through the edge sensor 130 to generate the deformation sensing signal. At Step S1140, the electronic device 110 determines whether the drop event of the device body occurs by analyzing the deformation sensing signal through the signal processing circuit 110. Therefore, the electronic device 100 of the embodiment is able to determine whether the drop event occurs while reduce power consumption.

Besides, sufficient teaching, suggestions, and implementation details about relevant device properties, technical details, and embodying details of the electronic device 100 of the embodiment are already provided in the embodiments of FIGS. 1 to 10. Thus, details in this regard will not be repeated in the following.

In view of the foregoing, the electronic device and the drop warning method according to the exemplary embodiments of the invention are able to effectively determine whether the drop event of the device body of the electronic device occurs. The signal processing circuit and the edge sensor of the electronic device are waken up to further sense the acceleration and analyze the signals when the acceleration sensor of the electronic device determines that the drop event may occur. Accordingly, the electronic device is able to accurately determine whether the drop event occurs and output the warning signal in a real-time manner. Besides, the electronic device and the drop warning method according to the exemplary embodiments of the invention are also able to reduce the power consumed by the signal processing circuit and the edge sensor.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, having a device body, the electronic device comprises:
    a signal processing circuit, operating in a sleep mode;
    an acceleration sensor, coupled to the signal processing circuit, configured to sense an acceleration variation of the device body to generate an acceleration sensing signal, wherein the acceleration sensor determines whether the acceleration sensing signal is continuously lower than an acceleration threshold for a preset length of time to wake up the signal processing circuit; and
    at least one edge sensor, coupled to the signal processing circuit and disposed at at least one frame position of the device body, wherein when the acceleration sensor wakes up the signal processing circuit, the signal processing circuit enables the at least one edge sensor, and the at least one edge sensor senses a deformation variation of the device body to generate at least one deformation sensing signal,
    wherein the signal processing circuit analyzes the at least one deformation sensing signal to determine whether a drop event of the device body occurs.

2. The electronic device as claimed in claim 1, wherein if the signal processing circuit determines that the drop event of the device body occurs, the signal processing circuit generates a warning signal, and if the signal processing circuit determines that the drop event of the device body does not occur, the signal processing circuit resumes to operate in the sleep mode.

3. The electronic device as claimed in claim 1, wherein the acceleration sensor is disposed in the device body, and the acceleration sensing signal comprises an X-axis acceleration value, a Y-axis acceleration value, and a Z-axis acceleration value,
    wherein when the acceleration sensor determines that the X-axis acceleration value, the Y-axis acceleration value, and the Z-axis acceleration value are all continuously lower than the acceleration threshold for the preset length of time, the acceleration sensor wakes up the signal processing circuit.

4. The electronic device as claimed in claim 1, wherein the acceleration sensor comprises a comparator and a controller; the comparator compares the acceleration threshold and the acceleration sensing signal to output a comparison result to the controller,
    wherein when the controller determines that the acceleration sensing signal is continuously lower than the acceleration threshold for the preset length of time, the controller outputs a wakeup signal to the signal processing circuit.

5. The electronic device as claimed in claim 1, wherein the at least one edge sensor is a balanced bridge structure comprising a plurality of pressure sensitive varistors.

6. The electronic device as claimed in claim 1, wherein the signal processing circuit comprises:

an analog-to-digital converter, coupled to and receiving the at least one deformation sensing signal, and configured to convert the at least one deformation sensing signal; and a signal processor, coupled to the analog-to-digital converter, and configured to receive the converted at least one deformation sensing signal, and analyze the converted at least one deformation sensing signal to determine whether the drop event of the device body occurs.

7. The electronic device as claimed in claim 6, wherein the signal processor analyzes the converted at least one deformation sensing signal to obtain a slope variation distribution having a plurality of slope values, and the signal processor determines whether the slope values exhibit a slope variation greater than a slope threshold to determine that the drop event of the device body occurs.

8. The electronic device as claimed in claim 6, wherein the signal processing circuit comprises:

a multiplexer, coupled to the at least one edge sensor, is configured to receive the at least one deformation sensing signal in a time-interleaved manner, and output the least one deformation sensing signal having a same sampling length, wherein a number of the at least one edge sensor is plural.

9. A drop warning method for an electronic device comprising a device body, the method comprising:

operating a signal processing circuit in a sleep mode;

sensing an acceleration variation of the device body by an acceleration sensor to generate an acceleration sensing signal, and determining whether the acceleration sensing signal is continuously lower than an acceleration threshold for a preset length of time by the acceleration sensor to wake up the signal processing circuit;

enabling at least one edge sensor by the signal processing circuit when the acceleration sensor wakes up the signal processing circuit, and sensing a deformation variation of the device body by the at least one edge sensor to generate at least one deformation sensing signal, wherein the at least one edge sensor is disposed at at least one frame position of the device body; and analyzing the at least one deformation sensing signal by the signal processing circuit to determine whether a drop event of the device body occurs.

10. The drop warning method as claimed in claim 9, further comprising:

generating a warning signal by the signal processing circuit if the signal processing circuit determines that the drop event of the device body occurs; and resuming to operate the signal processing circuit in the sleep mode if the signal processing circuit determines that the drop event of the device body does not occur.

11. The drop warning method as claimed in claim 9, wherein the acceleration sensor is disposed in the device body, and the acceleration sensing signal comprises an X-axis acceleration value, a Y-axis acceleration value, and a Z-axis acceleration value; wherein the step of determining whether the acceleration sensing signal is continuously lower than the acceleration threshold for the preset length of time by the acceleration sensor to wake up the signal processing circuit comprises:

waking up the signal processing circuit by the acceleration sensor when the acceleration sensor determines that the X-axis acceleration value, the Y-axis acceleration value, and the Z-axis acceleration value are all continuously lower than the acceleration threshold for the preset length of time.

12. The drop warning method as claimed in claim 9, wherein the acceleration sensor comprises a comparator and a controller; and the step of determining whether the acceleration sensing signal is continuously lower than the acceleration threshold for the preset length of time by the acceleration sensor to wake up the signal processing circuit comprises:

comparing the acceleration threshold and the acceleration sensing signal by the comparator to output a comparison result to the controller, and outputting a wakeup signal to the signal processing circuit by the controller when the controller determines that the acceleration sensing signal is continuously lower than the acceleration threshold for the preset length of time.

13. The drop warning method as claimed in claim 9, wherein the at least one edge sensor is a balanced bridge structure comprising a plurality of pressure sensitive varistors.

14. The drop warning method as claimed in claim 9, wherein the signal processing circuit comprises an analog to digital converter and a signal processor; wherein the step of analyzing the at least one deformation sensing signal by the signal processing circuit to determine whether the drop event of the device body occurs comprises:

receiving the at least one deformation sensing signal by the analog-to-digital converter, and converting the at least one deformation sensing signal; and receiving the converted at least one deformation sensing signal by the signal processor, and analyzing the converted at least one deformation sensing signal to determine whether the drop event of the device body occurs.

15. The drop warning method as claimed in claim 14, wherein the step of receiving the converted at least one deformation sensing signal by the signal processor, and analyzing the converted at least one deformation sensing signal to determine whether the drop event of the device body occurs comprises:

analyzing the converted at least one deformation sensing signal by the signal processor to obtain a slope variation distribution having a plurality of slope values; and determining whether the slope values exhibit a slope variation greater than a slope threshold by the signal processor to determine that the drop event of the device body occurs.

16. The drop warning method as claimed in claim 14, wherein the signal processing circuit further comprises a multiplexer, and a number of the at least one edge sensor is plural; wherein the step of sensing the deformation variation of the device body by the at least one edge sensor to generate the at least one deformation sensing signal comprises:

receiving the at least one deformation sensing signal by the multiplexer in a time-interleaved manner, and outputting the at least one deformation sensing signal having a same sampling length.

* * * * *